April 13, 1965     V. L. COCKERILL     3,177,584
ANIMAL DEHORNER APPARATUS
Filed Nov. 1, 1962
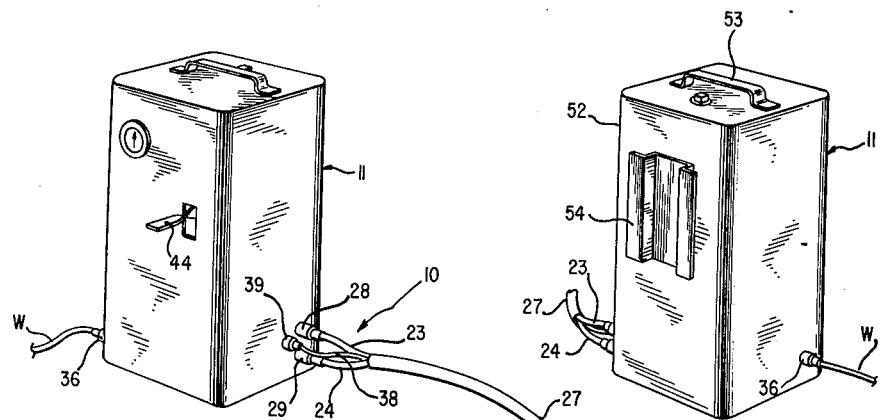
FIG. 2
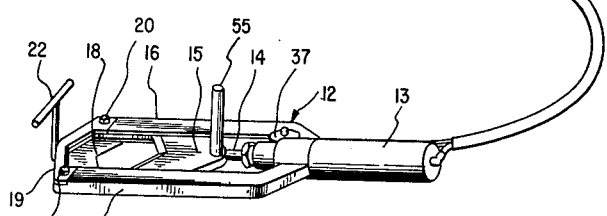
FIG. 1
FIG. 3
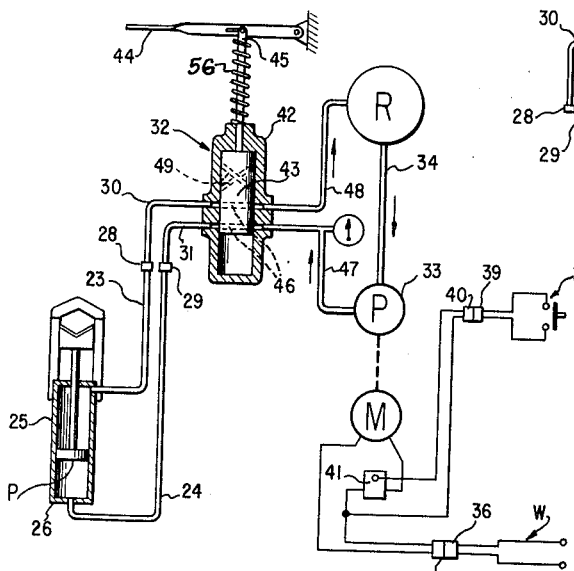
FIG. 4
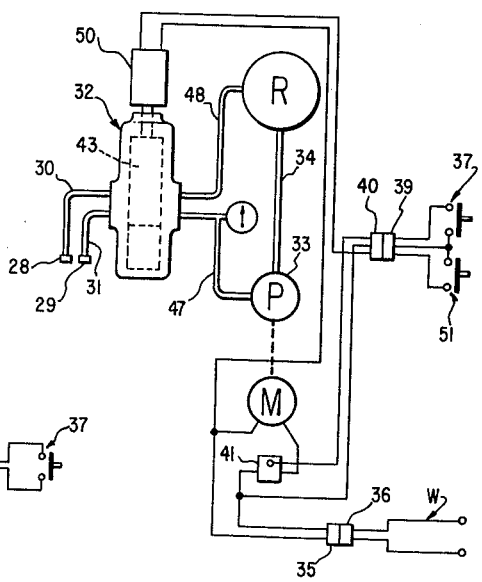
INVENTOR.
VERNON L. COCKERILL
BY *B. P. Fishburne, Jr.*
ATTORNEY

United States Patent Office 3,177,584
Patented Apr. 13, 1965

3,177,584
ANIMAL DEHORNER APPARATUS
Vernon L. Cockerill, 105 S. Liberty, Rushville, Ill.
Filed Nov. 1, 1962, Ser. No. 234,821
6 Claims. (Cl. 30—228)

The present invention relates to cutting apparatus and more particularly to cutting apparatus used for the removal of horns from horned animals such as cows.

Dehorning apparatus presently in use leave much to be desired since most of the devices are cumbersome, require considerable physical strength on the part of the operator, and subject the animal being dehorned to considerable discomfort. One such dehorning device presently in use is a cutter having a pair of blades, one fixed and the other reciprocable relative thereto to provide a cutting action on the horn. Reciprocation of the reciprocable blade is effected by a pair of handles which are brought together by the operator to remove the horn from the animal upon movement of the reciprocable blade relative to the stationary blade. The handles are quite long to provide the required leverage to effect a cutting operation by the blades and the device is extremely cumbersome. Another dehorning device presently in use is an electric saw whereby the horn of the animal is removed by a sawing action. The disadvantage of the electric saw is that the operation of the same is somewhat dangerous to both the operator and animal and has not been favorably accepted by veterinarians. Additionally, the electric saws are bulky and the dehorning operation resulting from the use thereof is of poor quality.

The dehorning apparatus of the present invention completely obviates the above disadvantages and has as its primary object the provision of a dehorning apparatus having a dehorning tool including a fixed and movable blade whereby fluid under pressure is utilized to effect movement of the movable blade to produce a more efficient cutting action.

Another object of the invention is to provide a dehorning apparatus including a double acting fluid motor which effects positive reciprocation of the blade to both a cutting position and a non-cutting position.

Another object of the invention is the provision of a dehorning apparatus including fixed and movable blades whereby the fixed blade can be readily changed.

Another object of the invention is the provision of a dehorning apparatus including a dehorning tool having fixed movable blades and fluid pressure means to operate the movable blade and means on the dehorning tool to effect operation of the fluid pressure means.

Another object of the invention is the provision of a dehorning apparatus having fixed and movable blades and fluid pressure means to operate the movable blade and a remote power source therefor.

Another object of the invention is the provision of a dehorning apparatus having a dehorning tool including a fixed and movable blade, fluid pressure means to operate the movable blade and a fluid motor on the dehorning tool which is also used as a handle which is grasped by the operator during use of the tool.

Another object of the invention is the provision of a dehorning apparatus having a dehorning tool including a fixed and movable blade wherein the movable blade is operated by fluid under pressure and a remote power unit operable by any available source of power to furnish fluid under pressure to the dehorning tool.

Other objects and advantages of the invention will become apparent during the course of the following detailed description.

In the accompanying drawings, forming a part of this application and in which like numerals are employed to designate like parts throughout the same, FIGURE 1 illustrates the dehorning apparatus including the remote power unit and the dehorning tool and the means by which the same are connected, FIGURE 2 is a perspective view of the rear side of the remote power unit illustrating clip means by which the same may be suitably mounted on either a vehicle or a cattle holding device, FIGURE 3 illustrates, schematically, the fluid circuit which provides fluid under pressure to the dehorning tool, and FIGURE 4 illustrates a modified form of the fluid circuit shown in FIGURE 3.

Referring now to the drawings in detail, and particularly to FIGURE 1 thereof, there is shown a preferred form of the dehorning apparatus of the present invention indicated generally by reference numeral 10. The dehorning apparatus includes a remote power source 11 and dehorning tool 12. The dehorning tool 12 is comprised of a fluid motor cylinder 13 in which is reciprocatively positioned a piston P fixed to one end of piston rod 14 which extends outwardly of the cylinder 13. A cutter blade 15 is mounted at the free end of piston rod 14 and is reciprocable upon admission of fluid under pressure to cylinder 13 and acting against piston P. The cutter blade 15 is positioned between a pair of longitudinally extending guide rails 16 and 17 which are fixed to opposite sides of cylinder 13. A stationary blade 18 is fixed to an end frame 19 removably mounted at the ends of guides 16 and 17 as by bolts or pins 20 and 21. The end frame is provided with a generally T-shaped handle 22 which, together with cylinder 13, is grasped by the operator during use of the dehorning tool 12.

Fluid under pressure is supplied to cylinder 13 from remote power unit 11, in a manner later described, through flexible conduits 23 and 24 which are in communication with the upper and lower ends 25 and 26 respectively of cylinder 13. Flexible conduits 23 and 24 are encased in flexible housing 27 whereby the same are prevented from entangling or interfering in any way with the dehorning operation.

Flexible conduits 23 and 24 are connected by quick release couplings 28 and 29 to fluid conduits 30 and 31 housed in the remote power unit 11 and in communication with a four-way valve 32. Remote power unit 11 also includes a fluid reservoir R, in which hydraulic fluid is contained and a pump 33 in communication with fluid reservoir R by means of conduit 34. Pump 33 is driven by motor M connected by suitable wires to plug 35 which removably receives a plug 36 connected to a convenient source of external electrical power. The circuit is completed to motor M from the external source of power through switch 37 upon actuation thereof. Switch 37 is positioned on the dehorning tool 12 in a convenient location whereby the same can be easily reached by the operator of the tool. Switch 37, mounted on the dehorning tool 12, is in electrical communication with the remote power unit 11 by means of electrical cable 38 extending through flexible housing 27. Electrical cable 38 has fixed to the end thereof a plug 39 which is removably engageable with a receptacle 40 in the remote power unit 11. Suitable wiring is provided to place the receptacle 40 in electrical communication with motor M through a relay 41 whereby upon actuation of switch 37 a circuit will be completed from the external source of electrical power through relay 41 to motor M to effect operation of the same.

Valve 32 comprises a housing 42 and includes a plug 43 reciprocable therein, which reciprocation is effected by movement of pivoted handle 44 through rod 45 fixed at one end to handle 44 and at its other end to plug 43.

Plug 43 is provided with passages 46 extending therethrough which, when the same occupies the position as shown in FIGURE 3, communicates the upper and lower ends 25 and 26 respectively of fluid motor 13 to pump 33 through conduit 47 and to reservoir R through conduit 48. Additional passages 49 are provided in plug 43 whereby upon movement of the same to its lowermost position, again referring to FIGURE 3, the communication of the upper and lower ends 25 and 26 of fluid motor 13 with pump 33 and reservoir R is reversed, that is, the upper end 25 of fluid motor 13 will be placed in communication with pump 33 through conduits 23, 30 and 47 while the lower end 26 of fluid motor 13 is placed in communication with reservoir R through conduits 24, 31 and 48.

As shown in FIGURE 3, operation of valve 32 to effect reversal of the communication between the upper and lower ends 25 and 26 of fluid motor 13 with pump 33 and reservoir R is effected by manual movement of lever 44 which causes reciprocation of valve plug 43.

An alternate arrangement is shown in FIGURE 4 wherein the solenoid 50 is provided to effect reciprocation of valve plug 43 when it is desired to reverse the communication between the upper and lower ends 25 and 26, of fluid motor 13 with pump 33 and reservoir R. Operation of solenoid 50 is effected by actuation of switch 51 which is positioned on the dehorning tool 12 in a convenient location easily reached by the operator. The location of switch 51 can be either adjacent switch 37 which operates motor M or on the opposite side of the tool from the position of switch 37, as shown in FIGURE 1.

The remote power unit 11 in which the reservoir R, pump 33, motor M, and valve 32 are contained includes an outer shell or casing 52 which serves to protect the foregoing components from damage. Shell 52 has fixed thereon a handle 53 by which the power unit 11 may be readily moved from one location to another. Fixed to the rear of the shell 52 as shown in FIGURE 2 is a clip 54 by which the power unit 11 may be mounted on a motor vehicle or cattle holding device during operation of the apparatus.

In the operation of the dehorning apparatus of the present invention, attention is first directed to FIGURES 1 and 3 of the drawing. The remote power unit 11 is suitably positioned either on a motor vehicle, cattle holding device or the like and communication with an external source of electrical power to the remote power unit 11 is effected through wire W and plug 36 connected to plug 35 as shown in FIGURE 3. The animal to be dehorned is suitably restrained and the operator of the dehorning apparatus grasps the dehorning tool 12 by the fluid motor 13 and T-shaped handle 22, whereby the same is placed over the horn of the animal, the horn extending between the movable blade 15 and the stationary blade 18. Switch 37 is actuated by the operator and through relay 41 to which the same is connected by plug 39 and receptacle 40 operation of motor M is initiated. Motor M which is in driving engagement with pump 33 causes the same to pump fluid from reservoir R through conduit 34 in the direction of the arrow. Hydraulic fluid passes from the pump 33 through conduit 47 and through one of the ports 46 in plug 43 of valve 42, and the same occupying the position shown in FIGURE 3 due to the bias of spring 56. Fluid passing through valve 32 continues through conduit 31 and conduit 24 into the lower end 26 of fluid motor 13. Hydraulic fluid from the reservoir R pumped as above-mentioned acts on the piston P in fluid motor 13 to cause movement of the movable blade 15 attached to the piston rod 14 thereof, whereby the horn of the animal will be severed between movable blade 15 and blade 18. To retract the movable blade 15, lever 44 is manually operated to cause vertical reciprocation of the spool 43 and valve body 42 to align passages 49 therein with conduits 30 and 31 in a manner whereby fluid pumped from reservoir R by pump 33 is directed through the conduit 30 and conduit 23 to the upper side 25 of fluid motor 13 to act against piston P to cause retraction of blade 15 from the horn cutting position. It will be apparent that when it is desired to pump fluid from reservoir R by operating pump 33, switch 37 must be closed to effect operation of motor M.

The operation of the cattle dehorning apparatus 10 is identical to that previously described when using a power unit constructed as shown in FIGURE 4 with the exception of the manner in which the flow of fluid from pump 33 and reservoir R is reversed to fluid motor 13. When using the dehorning apparatus 10 having the remote power unit shown in FIGURE 4, the dehorning tool 12 is applied to the animal in the same manner as previously described with the horn of the animal extending between movable blade 15 and stationary blade 18. Switch 37 is actuated which completes the circuit through relay 41 from the external source of power fed through wire W to motor M whereby the same drives pump 33 to pump fluid from reservoir R through conduit 34, conduit 47, conduit 31 to the lower side 26 of the fluid motor 13. The movable blade 15 is moved in response to the pressure developed on the fluid by pump 33 to cause the same to sever the horn of the animal. To retract movable blade 15, the flow of fluid must be reversed, that is, fluid must be made to flow from reservoir R by pump 33 through valve 32, conduit 30 and conduit 23 to the upper side 25 of fluid motor 13. This is effected by actuating switch 51 which completes a circuit to solenoid 50 which causes reciprocation of valve plug 43 in the same manner as described with respect to FIGURE 3 whereby the flow of fluid to fluid motor 13 will be reversed to cause retraction of movable blade 15.

It will be apparent from the foregoing that the dehorner apparatus of the present invention provides means for rapidly and efficiently removing the horns from animals in a more humane manner than devices presently in use and allows a single operator to use the same. Further, the dehorning apparatus of the present invention is more compact and lighter in weight whereby relatively little danger is involved in the use of the same as opposed to the considerable danger present in the use of mechanical dehorning apparatus presently on the market.

An additional safety feature of the dehorning apparatus 10 is the provision on the dehorning tool 12 of a safety lever 55 which is fixed to movable blade 15. The safety lever 55 will, during reciprocation of blade 15, engage the hand or arm of an operator if he has inadvertently placed the same in a position which could result in injury, making the operator aware of the fact that the tool is in operation and allowing the operator to remove that portion of the body which is in the area of danger.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. An animal dehorning apparatus comprising in combination a handle portion of a size and shape to be conveniently held in one hand of an operator, a guide frame having spaced parallel sides rigidly secured to the forward end of the handle portion and extending longitudinally forwardly thereof and lying in a common plane with the handle portion, a transverse end frame member on the forward end of the guide frame and having its ends detachably rigidly secured to said sides of the guide frame, an upstanding stabilizing handle on said transverse end frame member of a size and shape to be conveniently grasped by the other hand of said operator, whereby downward controlled pressure may be applied by the operator to both ends of said guide frame, a fixed dehorner blade anchored to said transverse end frame member and having a broad V-shaped cutting edge at its inner end arranged in opposition to the axis of said handle portion and transversely thereof, a cooperating movable dehorner blade on said guide frame and having its opposite sides guidingly engaged by said sides of the guide frame for straight line movement toward and away from said fixed blade, said movable blade provided in its forward end with a broad V-shaped cutting edge for shearing coaction with the cutting edge of the fixed blade, a piston rod coaxial with said handle portion and extending into the handle portion and having its forward end secured to the rear end of said movable blade, said handle portion having an internal cylinder chamber and conduits for fluid under pressure connected therewith near opposite ends thereof and communicating with said chamber, a piston mounted for reciprocation within said cylinder chamber between said conduits and secured to said piston rod, a remotely located power and control unit for said piston including a control valve having a reciprocatory plunger including port means selectively positionable to direct fluid from said valve to and from opposite sides of said piston for powering the piston in opposite directions to advance and retract said movable blade by positive power, said valve having a casing containing said plunger and having ports connected with remote ends of said conduits and adapted for selective registration with said port means of the plunger, manually operable means connected with the valve plunger to reciprocate it within said casing, and fluid pump means connected with the valve casing to supply working fluid under pressure thereto and to convey fluid therefrom including additional port means in the valve casing adapted to register with the port means of the valve plunger.

2. The invention as defined by claim 1, and an upstanding safety projection on said movable blade substantially at right angles thereto and to said guide frame to block placement of a hand or the like on or near said movable blade.

3. The invention as defined by claim 1, and an electric motor connected with said pump to operate the same, and a motor control switch on said guide frame near the forward end of the handle portion for convenient operation by the hand holding said handle portion.

4. An animal dehorning apparatus comprising a cylinder body portion of a size for conveniently holding in one hand of an operator, an elongated guide frame on the forward end of the cylinder including spaced parallel sides and extending forwardly of the cylinder and lying in a plane common to the axis of the cylinder and being narrow in a direction at right angles to said axis, a stabilizing handle on the forward end of the guide frame to be grasped by the other hand of the operator, whereby controlled downward pressure may be applied by the operator to opposite ends of the guide frame, a fixed shearing blade on the forward end of the guide frame having a rear shearing edge spaced from the cylinder body portion in opposed relation thereto, a movable shearing blade on the guide frame for guided reciprocation in a straight line longitudinally thereof and having a forward shearing edge in opposed cooperative relation to the shearing edge of said fixed blade, a piston within the cylinder body portion for reciprocation, a piston rod interconnecting said piston and movable blade and lying substantially in a common plane with said blades and guide frame, flexible conduits connected with the cylinder body portion near opposite ends thereof and on opposite sides of said piston to convey fluid under pressure to either side of the piston to fully power the same for movement forwardly or rearwardly with said movable blade, and manually controllable fluid pumping and control valve means connected with said flexible conduits remotely from the cylinder body portion and operable to selectively supply fluid under pressure within the cylinder body portion on either side of said piston.

5. The invention as defined by claim 4, and wherein said last-named means includes an electric motor, and a control switch for said motor on said apparatus near the cylinder body portion for convenient manipulation by the hand holding the cylinder body portion.

6. The invention as defined by claim 4, and a safety projection on one side of the movable blade and extending beyond one side of the guide frame and cylinder body portion and obstructing placement of a hand or the like on or near the movable blade to prevent injury to the hand.

References Cited by the Examiner
UNITED STATES PATENTS

| | | | |
|---|---|---|---|
| 706,481 | 8/02 | Wilson | 30—228 |
| 2,228,635 | 1/41 | Magennis | 30—228 |
| 2,257,245 | 9/41 | Rudolph | 30—228 |
| 2,385,419 | 9/45 | Matulich | 30—228 X |
| 2,602,224 | 7/52 | McKay | 30—228 |
| 2,733,506 | 2/56 | Wild | 30—228 |
| 2,751,943 | 6/56 | Ford | 30—228 X |
| 3,056,267 | 10/62 | McRee | 30—241 X |

WILLIAM FELDMAN, *Primary Examiner.*